(12) United States Patent
Avati et al.

(10) Patent No.: US 9,110,917 B2
(45) Date of Patent: Aug. 18, 2015

(54) CREATING A FILE DESCRIPTOR INDEPENDENT OF AN OPEN OPERATION

(71) Applicant: Red Hat, Inc., Raleigh, NC (US)

(72) Inventors: Anand Vishweswaran Avati, Mysore (IN); Amar Tumballi Suryanarayan, Shimoga (IN)

(73) Assignee: Red Hat, Inc., Raleigh, NC (US)

( * ) Notice: Subject to any disclaimer, the term of this patent is extended or adjusted under 35 U.S.C. 154(b) by 52 days.

(21) Appl. No.: 13/739,856

(22) Filed: Jan. 11, 2013

(65) Prior Publication Data

US 2014/0201214 A1 Jul. 17, 2014

(51) Int. Cl.
*G06F 7/00* (2006.01)
*G06F 17/30* (2006.01)

(52) U.S. Cl.
CPC ............................. *G06F 17/30194* (2013.01)

(58) Field of Classification Search
CPC ............... G06F 17/30203; G06F 17/30197; H04L 67/1097
USPC ................. 707/705, 716, 726, 736, 748, 770
See application file for complete search history.

(56) References Cited

U.S. PATENT DOCUMENTS

| | | | |
|---|---|---|---|
| 6,192,389 B1 * | 2/2001 | Ault et al. | 718/101 |
| 7,418,439 B2 | 8/2008 | Wong | |
| 8,224,880 B2 * | 7/2012 | Murotani et al. | 707/831 |
| 8,239,486 B2 * | 8/2012 | Susairaj et al. | 709/218 |
| 8,301,597 B1 * | 10/2012 | Zhou et al. | 707/626 |
| 2002/0133526 A1 * | 9/2002 | Cronk et al. | 709/100 |
| 2008/0072236 A1 * | 3/2008 | Pope et al. | 718/108 |
| 2012/0330896 A1 * | 12/2012 | Runstedler et al. | 707/634 |

* cited by examiner

*Primary Examiner* — MD. I Uddin
(74) *Attorney, Agent, or Firm* — Lowenstein Sandler LLP

(57) ABSTRACT

A server computer system receives a file access request for accessing a file in a file system. The file access request includes a file handle for the file. The server computer system assigns a value as a file descriptor for the file. The assignment is performed without issuing a file open request to open the file. The server computer system associates the file descriptor with the file handle in a data store accessible to a storage subsystem and provides the file descriptor for accessing the file to the storage subsystem according to the file access request.

9 Claims, 5 Drawing Sheets

CREATING A FILE DESCRIPTOR INDEPENDENT OF AN OPEN OPERATION

TECHNICAL FIELD

The present disclosure relates to creating a file descriptor, and more particularly, to creating a file descriptor independent of an open operation.

BACKGROUND

Data may be stored in a structured data format, such as in a database, and/or data may be stored as unstructured data, for example, in files and folders in a digital file system. Some file systems may be a distributed file system and may have a disk-based data storage in the backend. Typically, a disk-based file system has an architecture where the storage layer that performs the operations for storing and retrieving the data uses file names and directory names on the disk-based backend. The distributed file system can access data, which is a file or a directory, by using a path (e.g., file path) to the data on the disk-based backend.

Some file systems may be implemented in the kernel space and some file systems may be implemented in a user space. Generally, file systems that are implemented in the user space may be restricted to perform file access operations on files in the file system using the file name and the file path. When a file is created in a file system, some file systems generate a file handle for the file. A file handle is a file identifier that is independent of the file name and can be used to access the file. Clients, such as NFS (network file system) clients, can store the file handle and can use the file handle for subsequent requests to access a file. The NFS client communicates with an NFS server regarding file access requests, and the NFS server further communicates with the storage subsystem in the file system regarding file access requests. Generally, at the storage level, the storage subsystem uses a file descriptor for the file to perform an operation (e.g., open file operation), rather than using a file handle. A file descriptor is an index for an entry in a kernel-resident data structure containing the details of the open files. In POSIX (portable operating system interface), the data structure may be called a file descriptor table. Generally, the NFS server does not have read/write access to the file descriptor table that includes the file descriptors for the open files. Typically, the file descriptors are assigned by the kernel, and the kernel records the assignment in the file descriptor table.

Traditionally, when the NFS server receives a file handle from the NFS client, the NFS server has to request that the file be opened in order for the kernel to assign a file descriptor to the file. Conventionally, the NFS server makes a system call, using the network RPC (remote procedure calls) protocol to request the kernel to open the file. In response to the system call, the kernel would open the file, make the file descriptor assignment for the file, and return the file descriptor to the NFS server. The NFS storage server would then use the file descriptor, which was returned from the kernel, to issue a read call to the storage subsystem to perform a read operation on the file. When the read operation is complete, the NFS storage server would issue a close call. Generally, the system calls (e.g., open) made by the NFS storage server are costly in that the calls add networking delay, and take greater time to process because the calls are made by the NFS storage server using the network RPC protocol.

BRIEF DESCRIPTION OF THE DRAWINGS

The present disclosure will be understood more fully from the detailed description given below and from the accompanying drawings of various implementations of the disclosure.

DETAILED DESCRIPTION

Described herein are a method and system for creating a file descriptor for a file without performing an open operation on the file, according to various implementations. Some file systems can support clients that use file handles in communications. A file handle is a structure to uniquely identify files. The file handle can be a unique file identifier for the file that is independent from a user visible file name for the file. The word "unique" can mean "practically unique," "situationally unique," or "contextually unique." For example, the file system may store a file named "schedule" in a directory "userdata". When the file is created, a file system server may assign a file handle "0712a57a-c493-4c6f-a0e9-8fe26a524f23" to the file "schedule". The file system server may provide the file handle to file system clients, which can use the file handle when communicating with the servers in the file system. For example, a file system client may be a NFS (network file system) client that uses a persistent file handle when requesting access to a file. For example, the NFS client may request access to the file "schedule" and can include the file handle "0712a57a-c493-4c6f-a0e9-8fe26a524f23" in the request to a NFS server in the file system. The NFS server in the file system can communicate with the NFS client at the NFS level to handle the request.

The NFS server can communicate with the storage subsystem in the file system to facilitate the access to the file on the disk in the file system. At the storage level, the storage subsystem should receive a file descriptor from the NFS server, rather than a file handle, when the NFS server is sending a file access request to the storage subsystem. Implementations create a simulated file descriptor, which the NFS server can provide to the storage subsystem for accessing a file. As a result, the NFS server no longer needs to request the kernel to open the file to provide a file descriptor to the NFS server via expensive network RPC (remote procedure call) communications to the kernel. A "simulated file descriptor" hereinafter refers to a file descriptor that is not provided by the kernel but rather created by the NFS server which ties the simulated file descriptor to the file. Implementations can reduce the system calls made by a file system storage server (e.g. NFS server) to the kernel by having the NFS server assign a simulated file descriptor to the file (e.g., "schedule"). When the NFS server receives the request from the NFS client, implementations create the simulated file descriptor for the file on-demand. Implementations eliminate the task of the NFS server performing a remote procedure call (RPC) to request the kernel to open the file in order to create an actual file descriptor for the file. The NFS storage server can use the simulated file descriptor to communicate with the storage subsystem (e.g., storage modules) at the storage level.

Figure 1:
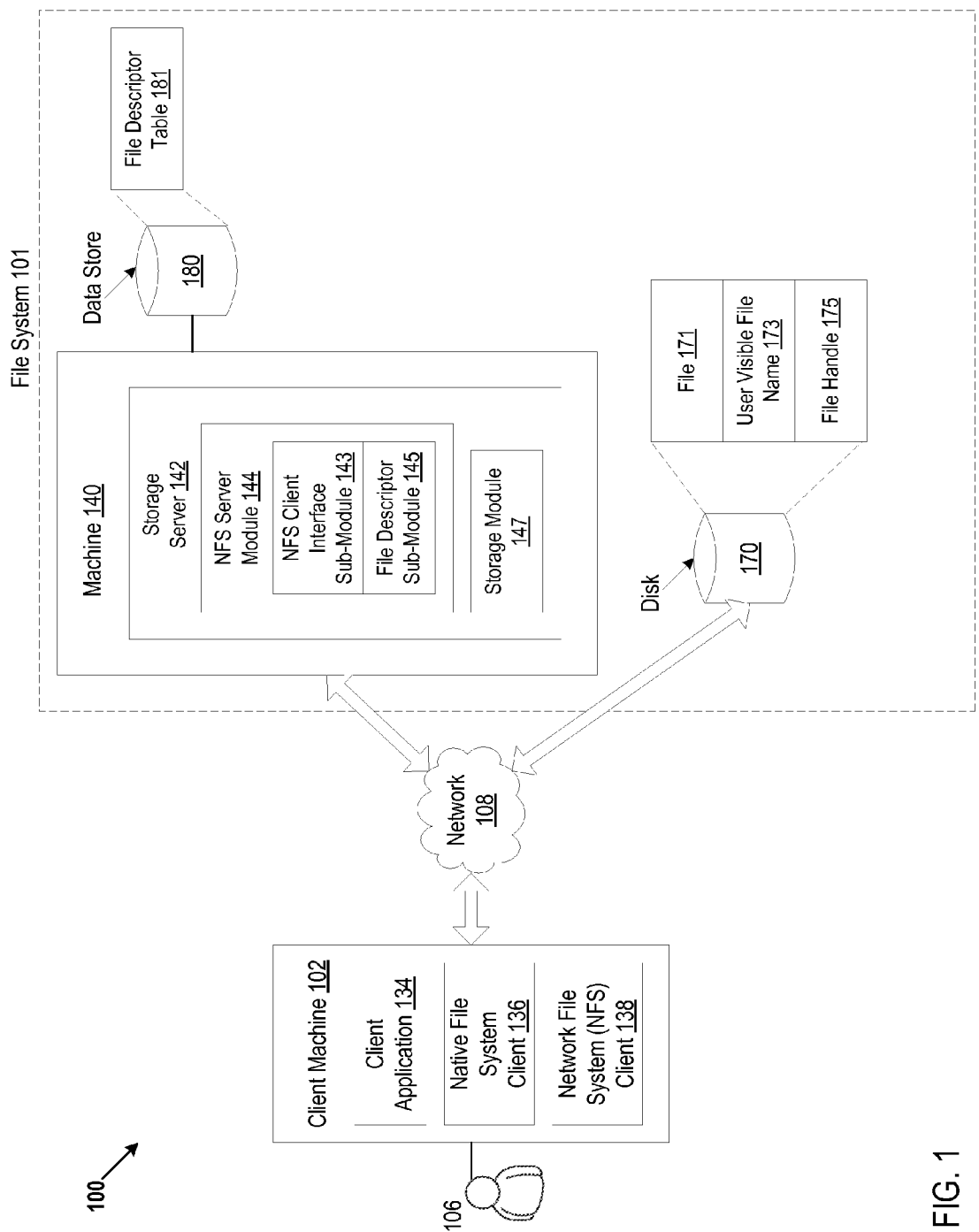
FIG. 1 illustrates an example system architecture, in accordance with various implementations.

FIG. 1 is an example system architecture 100 for various implementations. The system architecture 100 can include a distributed file system 101 coupled to one or more client machines 102 via a network 108. The network 108 may be a public network, a private network, or a combination thereof. The distributed file system 101 can be a network attached storage file system that includes one or more machines 140 and one or more mass storage devices, such as magnetic or optical storage based disks 170, solid-state drives (SSDs) or hard drives, coupled to the machines 140 via the network 108.

The distributed file system 101 can store data as files 171 on storage devices (e.g., disks 170) and can include directories, that are virtual containers within the file system 101, in which groups of computer files 171 and possibly other directories can be kept and organized. Files 171 that are related can be stored in the same directory. The files 171 can have user visible file names 173 that point to the actual location of the stored files in the storage device (e.g., disk 170). The user visible file names 173 can be based, for example, on user input received from a user 106 via the client application 134 and/or a file system client (e.g., native file system client 136, NFS (network file system) client 138).

A machine 140 can include a storage server 142 to manage access to the files 171 that are stored in the file system 101. One or more client machines 102 can include a file system client to communicate with the storage servers 142 in the file system 101. Examples of file system clients can include, and are not limited to, native file system clients 136 and NFS clients 138. "Native" can describe support for specific operating systems. For example, a native file system client 136 may be, and is not limited to, a file system client that supports the Linux operating system. The storage server 142 can include a storage subsystem, which can include a storage module 147 to handle requests from the native file system clients 136 to access the files 171.

The storage server 142 can also include a NFS server module 144 to handle requests from NFS clients 138 to access the files 171. The NFS server module 144 can include a NFS client interface sub-module 143 to communicate with the NFS clients 138. The machines 140 can include, and are not limited to, any data processing device, such as a desktop computer, a laptop computer, a mainframe computer, a personal digital assistant, a server computer, a handheld device or any other device configured to process data. The client machine 102 may be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like.

The client machines 102 can host one or more applications 134. An application 134 can be any type of application including, for example, a web application, a desktop application, a browser application, etc. An application 134 may request access (e.g., read, write, etc.) to the files 171 in the file system 101 via a file system client (e.g., native file system client 136, NFS client 138).

For example, the storage module 147 may store a file 171 with a user visible name 173 "schedule" that points to the file 171. When the file 171 "schedule" is created by the storage module 147, the storage module 147 can assign a file handle 175 "0712a57a-c493-4c6f-a0e9-8fe26a524f23" to the file 171. The storage module 147 can generate a file handle 175 for the file 171 based on configuration data, which may be stored in a data store 180 that is coupled to the storage module 147, that defines a format to use for the file handle to be created. The NFS server module 144 can provide the file handle 175 "0712a57a-c493-4c6f-a0e9-8fe26a524f23" to the NFS client 138. The NFS client 138 may request access to the file 171 "schedule" using the file handle 175 "0712a57a-c493-4c6f-a0e9-8fe26a524f23" in the request. The NFS client interface sub-module 143 in the NFS server module 144 can communicate with the NFS client 138 at the NFS level to handle the request. The NFS server module 144 can communicate with file system modules (e.g., storage module 147) at the storage level to facilitate performance of the storage related operations (e.g., read, write, etc.) on the file 171 at the storage level.

At the storage level, the NFS server module 144 should use a file descriptor to communicate with the file system modules (e.g., storage module 147) to facilitate access to the file 171. The NFS server module 144 can include a file descriptor sub-module 145 to create a simulated file descriptor for a file and to associate the file handle for the file with the simulated file descriptor of the file. The file descriptor sub-module 145 can create the simulated file descriptor for the file 171 on-demand according to the request from the NFS client 138 without having the NFS server module 144 send a request to the kernel via RPC for the kernel to open the file 171 and have the kernel provide an actual file descriptor for the file. The simulated file descriptor can be an integer that simulates an index value to an entry in a file descriptor table 181 for the NFS server module 144 stored on a data store 180 that is coupled to the storage server 142. For example, the file descriptor sub-module 145 may generate an integer "3" as the simulated file descriptor for the file 171 "schedule" and file handle 175 "0712a57a-c493-4c6f-a0e9-8fe26a524f23".

The file descriptor sub-module 145 can provide the simulated file descriptor for the file 171 to one or more file system modules. For example, the file descriptor sub-module 145 can provide the simulated file descriptor for the file 171 to the NFS client interface sub-module 143. The NFS client interface sub-module 143 can use the simulated file descriptor (e.g., "3") to communicate with the storage module 147 at the storage level. For example, the NFS client interface sub-module 143 can use the simulated file descriptor (e.g., "3") to send a request for a read operation of the file 171 to the storage module 147. Other file system modules (e.g., translator module) can use the simulated file descriptor to perform file system operations.

The storage server 142 can include a storage subsystem having a storage module 147 to identify a simulated file descriptor in a request from the NFS server module 144. The storage module 147 can use mapping data, which may be generated by the file descriptor sub-module 145, that associates file handles to simulated file descriptors, to identify a file handle that corresponds to the simulated file descriptor. The storage module 147 can use the file handle that corresponds to the simulated file descriptor to identify a path for the file 171. In one implementation, the storage module 147 constructs a path for a hard link, which points to the file 171. In one implementation, the storage module 147 creates the path for the hard link based on the file handle. A hard link is a directory entry that points to a location of a file in a file system. Similar to file names, multiple hard links can be created for the same file. If the file is opened using one of its hard links, and changes are made to its content, then the changes can also be visible when the file is opened by an alternative hard link or the file name of the file. The hard link can point to the actual data for the file that is stored in the data store.

In another implementation, the storage module 147 determines the path for the file 171 from a database that stores mapping data that maps file handles to file paths. The storage module 147 can use the path to perform an actual open operation on the file 171, which was requested, for example, by the NFS client 138.

The data store 180 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

Figure 2:
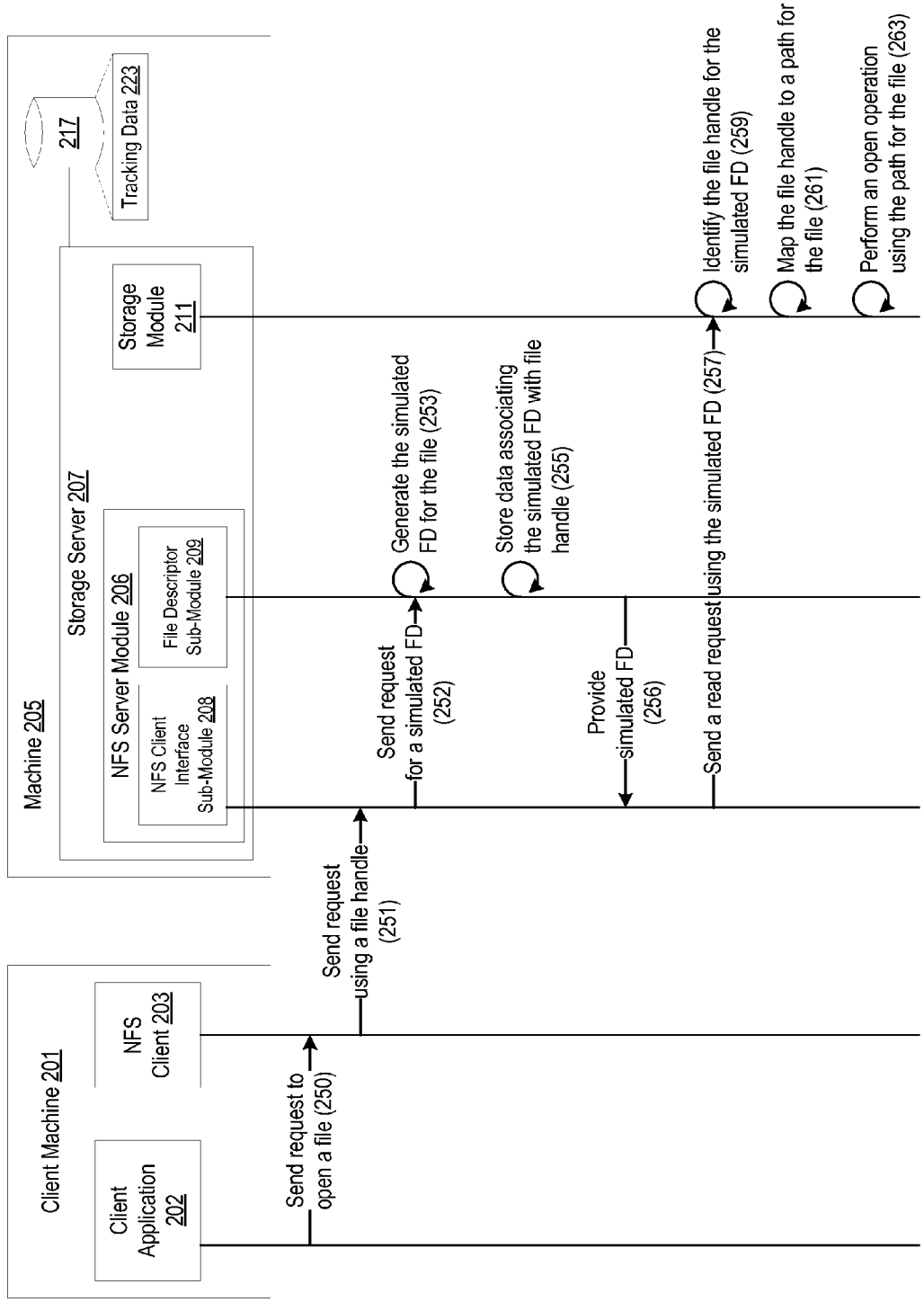
FIG. 2 is a block diagram of an implementation of a NFS (network file system) server module, a NFS client interface sub-module, a file descriptor sub-module, and a storage module using a simulated file descriptor for accessing a file.

FIG. 2 is a block diagram of an implementation of a NFS server module 206, a NFS client interface sub-module 208, a file descriptor sub-module 209, and a storage module 211 using an simulated file descriptor for accessing a file. The NFS server module 206 may correspond to a NFS server module 144 in a server 142 in a machine 140 of FIG. 1. The NFS client interface sub-module 208 may correspond to a NFS client interface sub-module 208 in a server 142 in a machine 140 of FIG. 1. The file descriptor sub-module 209 may correspond to a file descriptor sub-module 145 in a server 142 in a machine 140 of FIG. 1. The storage module 211 may correspond to a storage module 147 in a server 142 in a machine 140 of FIG. 1. Note that in alternative implementations, the functionality of one or more of the modules and/or sub-modules can be combined or divided.

A client application 202 on a client machine 201 may request an operation (e.g., read, write, etc.) on a file that is stored in a file system. The client application 202 can send (250) a request to the file system client (e.g., NFS client 203) on the client machine 201 for access to the file. The NFS client 203 can mount the file system that includes the machine 205 and can send (251) a request to access the file to the storage server 207 hosted on the machine 205. The request can include the file handle for the file.

The NFS server module 206 in the storage server 207 can include a NFS client interface sub-module 208 to receive the request from the NFS client 203. The NFS client interface sub-module 208 can send (252) a request for a simulated file descriptor to the file descriptor sub-module 209. In one implementation, the NFS client interface sub-module 208 performs a function call to the file descriptor sub-module 209 and passes the file handle as a parameter to the file descriptor sub-module 209. The file descriptor sub-module 209 can receive the request that includes the file handle and can generate (253) a simulated file descriptor for the file without having the NFS server module 206 to send a request to the kernel to open the file and without having the kernel to provide an actual file descriptor for the file. The file descriptor sub-module 209 can use tracking data 223 that is stored in a data store 217 that is coupled to the storage server 207 to determine which value to use for the simulated file descriptor. The tracking data 223 can include integers that have already been assigned and may not be available for use as the simulated file descriptor. The tracking data 223 can include the already assigned simulated file descriptors and the file handles that correspond to the already assigned simulated file descriptors.

The file descriptor sub-module 209 can select an available integer, such as, for example, and not limited to, the next available integer as the simulated file descriptor, and can store (255) data that associates the simulated file descriptor with the file handle in the tracking data 223. The file descriptor sub-module 209 can provide (256) thesimulated file descriptor to the NFS client interface sub-module 208. The NFS client interface sub-module 208 can use the simulated file descriptor to send (257) a request for a read operation to the storage subsystem (e.g., storage module 211 in the storage subsystem). For example, the NFS client interface sub-module 208 may send a read request to the storage module 211 using the simulated file descriptor as a parameter in the read request.

The storage module 211 can receive the simulated file descriptor as part of the read request and can identify (259) the file handle that corresponds to the simulated file descriptor. The data store 217 is accessible to the storage module 211. The storage module 211 may examine the tracking data 223 in the data store 217 to determine the file handle that corresponds to the simulated file descriptor. The storage module 211 can map (261) the file handle to a path for the file. In one implementation, the storage module 211 constructs a path for a hard link, which points to the file. The storage module 211 can create the path for the hard link based on the file handle. In another implementation, the storage module 211 determines the path for the file from a database that stores mapping data that maps file handles to file paths and is coupled to the storage module 211.

The storage module 211 can perform (263) an open operation using the path for the file, which was requested by the NFS client 203. Subsequently, the NFS server module 206 may send a close request using the simulated file descriptor to the storage module 211, and the storage module 211 can identify the file handle from the simulated file descriptor, determine a path for the file to close from the file handle, and close the file using the path.

The data store 217 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

Figure 3:
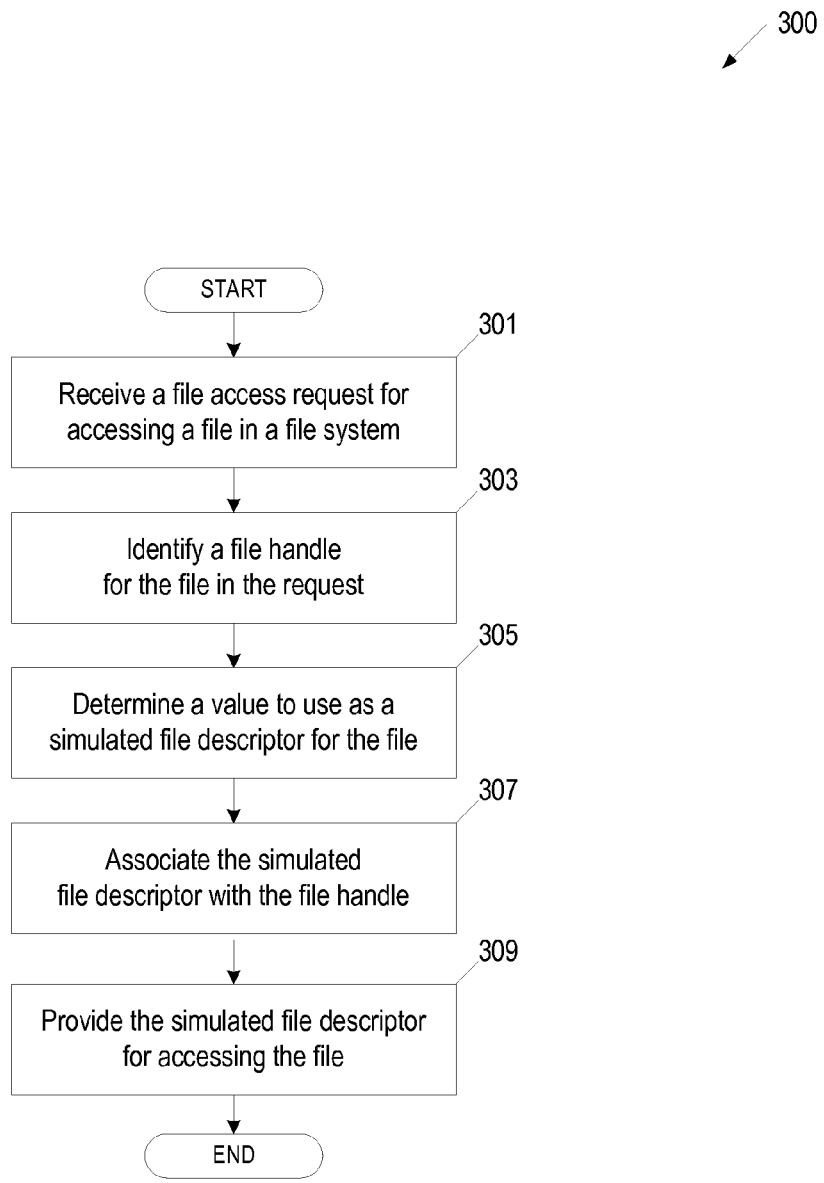
FIG. 3 is a flow diagram illustrating an implementation for a method for creating a file descriptor for a file without sending a request to the operating system (e.g., kernel) to open the file.

FIG. 3 is a flow diagram of an implementation of a method 300 for creating a file descriptor for a file without sending a request to the operating system (e.g., kernel) to open the file. Method 300 can be performed by processing logic that can comprise hardware (e.g., circuitry, dedicated logic, programmable logic, microcode, etc.), software (e.g., instructions run on a processing device), or a combination thereof. In one implementation, method 300 is performed by a file descriptor sub-module 145 in a server 142 in a machine 140 of FIG. 1.

At block 301, the server receives a file access request for accessing a file in the file system. The request can include a file handle for the file. The request may be received from a NFS client. At block 303, the server identifies the file handle for the file in the request. For example, the file handle in the request may be based on the UUID (universally unique identifier) standard. A UUID is a 16-octet (128-bit) number. A UUID has a standard form that is represented by 32 heaxadecimal digits, displayed in five groups separated by hyphens, in the form 8-4-4-4-12 for a total of 36 characters (32 digits and four hyphens). For example, the file handle may be a UUID of "550e8400-e29b-41d4-a716-446655440000".

At block 305, the server determines which value to use for the simulated file descriptor. An example of a value can include, and is not limited to, an integer. The server can use tracking data that is stored in a data store that is coupled to the storage server to determine an available integer to use as the simulated file descriptor. For example, the tracking data may indicate that the integer "3" is already assigned as a simulated file descriptor to another file handle "0712a57a-c493-4c6f-a0e9-8fe26a524f23". The tracking data may indicate that the next available integer may be "4", and the server may assign the integer "4" as the simulated file descriptor for the file handle "550e8400-e29b-41d4-a716-446655440000". At block 307, the server associates the simulated file descriptor with the file handle. The server can store data that associates the simulated file descriptor (e.g., "4") with the file handle (e.g., "550e8400-e29b-41d4-a716-446655440000") in the tracking data. The assignment, by the server, of the value as the simulated file descriptor for the file replaces the operating system (e.g., kernel) having to open the file and create a file descriptor for the file. At block 309, the server provides the simulated file descriptor for accessing the file according to the request. For example, the server provides "4" to the NFS client interface sub-module as the simulated file descriptor. The server can provide the simulated file descriptor for the file to other file system modules (e.g., translator module) to use for processing input/output operations.

Figure 4:
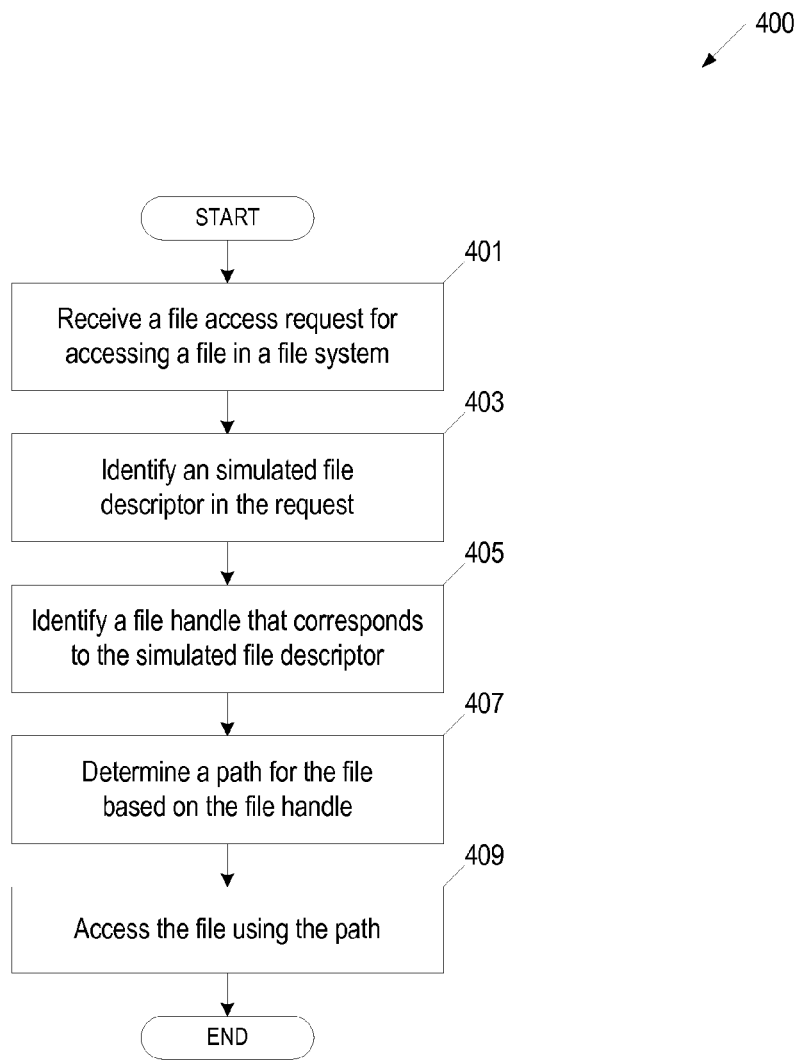
FIG. 4 is a flow diagram illustrating an implementation for a method for using a simulated file descriptor for accessing a file.

FIG. 4 is a flow diagram of an implementation of a method 400 for using a simulated file descriptor for accessing a file. Method 400 can be performed by processing logic that can comprise hardware (e.g., circuitry, dedicated logic, programmable logic, microcode, etc.), software (e.g., instructions run on a processing device), or a combination thereof. In one implementation, method 400 is performed by a storage module 147 in a server 142 in a machine 140 of FIG. 1.

At block 401, the server receives a file access request for accessing a file in a file system. The request can include a simulated file descriptor for the file. At block 403, the server identifies the simulated file descriptor in the request. For example, the simulated file descriptor may be the integer "4". At block 405, the server identifies the file handle that corresponds to the simulated file descriptor. The server may examine tracking data that is stored in a data store that is coupled to the server to determine the file handle that corresponds to the simulated file descriptor. For example, the tracking data may indicate that the file handle "550e8400-e29b-41d4-a716-446655440000" corresponds to the simulated file descriptor "4". At block 407, the server determines a path for the file based on the file handle. In one implementation, the server constructs a path for a hard link that points to the file using the file handle. In another implementation, the server determines the path for the file using stored data that maps file handles to file paths. For example, the stored data may be in a database that stores mapping data that maps file handles to file paths. The database may be stored in the data store. At block 409, the server accesses the file using the path. For example, the server can perform an open operation using the path for the file.

Figure 5:
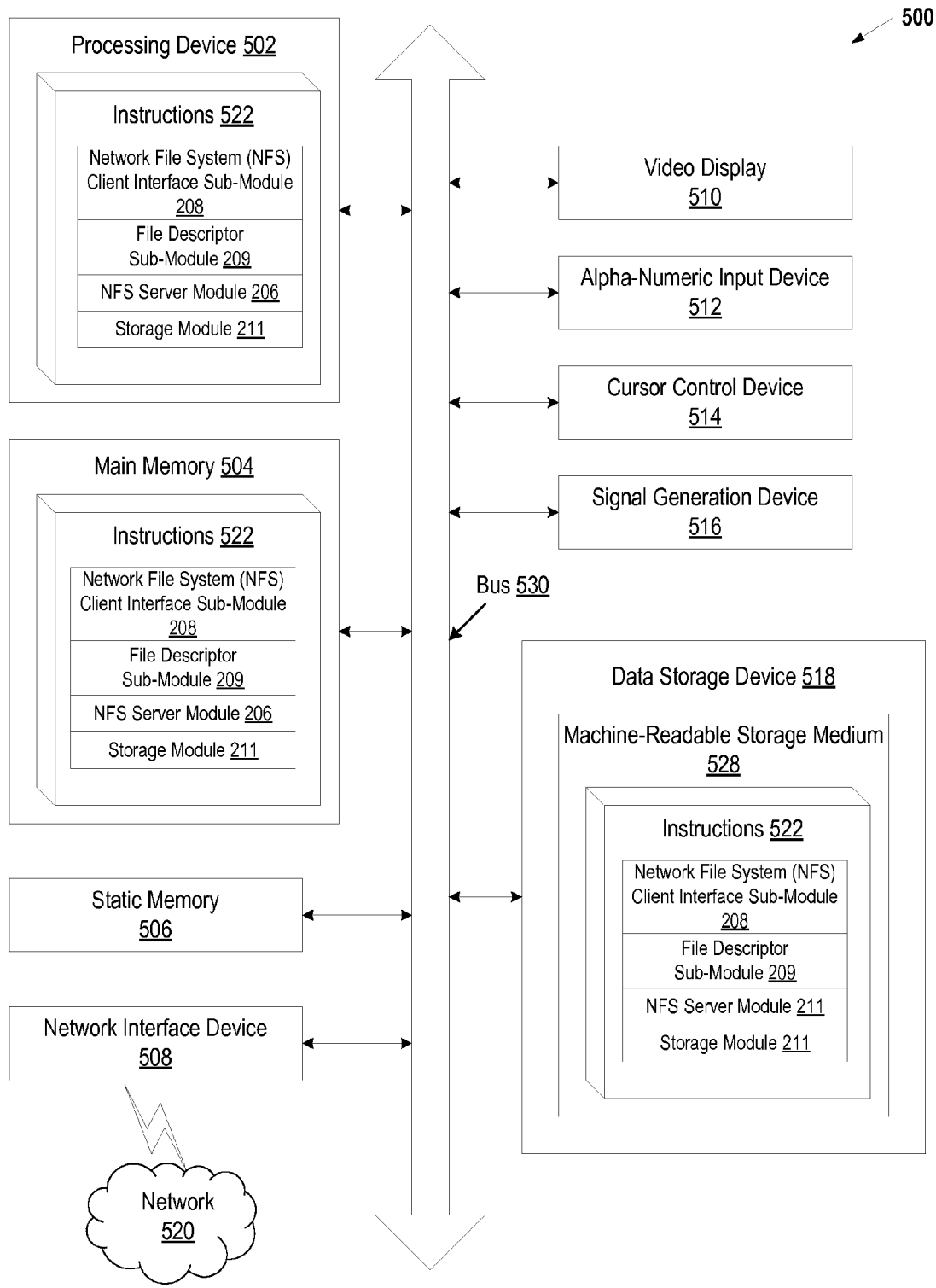
FIG. 5 is a block diagram of an example computer system that may perform one or more of the operations described herein.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-readable storage medium 528 (also known as a computer-readable medium) on which is stored one or more sets of instructions or software 522 embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting machine-readable storage media.

In one implementation, the instructions 522 include instructions for a NFS (network file system) server module (e.g., NFS server module 206 of FIG. 2), a NFS client interface sub-module (e.g., NFS client interface sub-module 208 of FIG. 2), a file descriptor sub-module (e.g., file descriptor sub-module 209 of FIG. 2), and/or a storage module (e.g., storage module 211 of FIG. 2), and/or a software library containing methods that call modules in a NFS server module, a NFS client interface sub-module, a file descriptor sub-module, and/or a storage module. While the machine-readable storage medium 528 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving" or "assigning" or "associating" or "providing" or "identifying" or "determining" or "opening" or "constructing" or "examining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method, comprising:
    receiving, by a processing device that executes a server in a network file system, a first file access request from a client in the network file system for accessing a file in the network file system, wherein the first file access request comprises a file handle for the file, and wherein the file handle comprises a unique identifier for the file;
    in response to receiving the first file access request, creating and assigning, by the server, a simulated file descriptor to the file without issuing a file open request to an operating system to open the file to create an actual file descriptor, wherein the simulated file descriptor is not provided by a kernel of the operating system;
    associating, by the server, the simulated file descriptor with the file handle;
    in response to receiving a second file access request comprising the simulated file descriptor:
        identifying the file handle associated with the simulated file descriptor in view of the simulated file descriptor in the second file access request and associated with the file handle;
        identifying a path to the file in view of the identified file handle, wherein identifying the path comprises at least one of identifying a hard link associated with the file or identifying the path in a database that stores mapping data that maps the path to the file handle; and
        opening the file in view of the identified path.

2. The method of claim 1, wherein assigning the simulated file descriptor to the file comprises examining tracking data to determine an available integer value.

3. The method of claim 1, wherein the second file access request is received from a network file system (NFS) client.

4. A non-transitory computer-readable storage medium having instructions stored therein that, when executed by a processing device, cause the processing device to:
    receive, by the processing device that executes a server in a network file system, a first file access request from a client in the network file system for accessing a file in the network file system, wherein the first file access request comprises a file handle for the file, and wherein the file handle comprises a unique identifier for the file;
    in response to the receipt of the first file access request, create and assign, by the server, a simulated file descriptor to the file without issuing a file open request to an operating system to open the file to create an actual file descriptor, wherein the simulated file descriptor is not provided by a kernel of the operating system;
    associate, by the server, the simulated file descriptor with the file handle;
    in response to receipt of a second file access request comprising the simulated file descriptor:
        identify the file handle associated with the simulated file descriptor in view of the simulated file descriptor in the second file access request and associated with the file handle;
        identify a path to the file in view of the identified file handle, wherein the processing device is to identify the path by at least one of identifying a hard link associated with the file or identifying the path in a database that stores mapping data that maps the path to the file handle; and
        open the file in view of the identified path.

5. The non-transitory computer-readable storage medium of claim 4, wherein the instructions are further to cause the processing device to assign the simulated file descriptor to the file by examining tracking data to determine an available integer value.

6. The non-transitory computer-readable storage medium of claim 4, wherein the second file access request is received from a network file system (NFS) client.

7. A system comprising:
a memory;
a processing device, coupled to the memory, to execute a server in a network file system to:
receive a first file access request from a client in the network file system for accessing a file in the network file system, wherein the first file access request comprises a file handle for the file, and wherein the file handle comprises a unique identifier for the file;
in response to the receipt of the first file access request, create and assign a simulated file descriptor to the file without issuing a file open request to an operating system to open the file to create an actual file descriptor, wherein the simulated file descriptor is not provided by a kernel of the operating system;
associate the simulated file descriptor with the file handle;
in response to receipt of a second file access request comprising the simulated file descriptor:
identify the file handle associated with the simulated file descriptor in view of the simulated file descriptor in the second file access request and associated with the file handle;
identify a path to the file in view of the identified file handle, wherein the processing device is to identify the path by at least one of identifying a hard link associated with the file or identifying the path in a database that stores mapping data that maps the path to the file handle; and
open the file in view of the identified path.

8. The system of claim 7, wherein the processing device is to assign the simulated file descriptor to the file by examining tracking data to determine an available integer value.

9. The system of claim 7, wherein the second file access request is received from a network file system (NFS) client.

\* \* \* \* \*